United States Patent [19]

Evans et al.

[11] 4,452,539

[45] Jun. 5, 1984

[54] BEARING SEAL FOR ROTATING CUTTER DRILL BIT

[75] Inventors: Robert F. Evans; Randy C. Davis, both of Dallas, Tex.

[73] Assignee: Varel Manufacturing Company, Dallas, Tex.

[21] Appl. No.: 314,784

[22] Filed: Oct. 26, 1981

[51] Int. Cl.$^3$ ............................................. F16C 33/74
[52] U.S. Cl. ....................................... 384/94; 384/130
[58] Field of Search .................... 384/94, 95, 130, 92, 384/152; 308/241, 187.1; 175/371, 372

[56] References Cited

U.S. PATENT DOCUMENTS

| | | |
|---|---|---|
| 3,484,349 | 12/1969 | Vrable . |
| 3,616,418 | 10/1971 | Anderson et al. . |
| 3,649,492 | 3/1972 | Marsh et al. . |
| 3,734,181 | 5/1973 | Shaffer . |
| 3,761,145 | 9/1973 | Schumacher, Jr. . |
| 3,891,394 | 6/1975 | Smith et al. . |
| 3,977,956 | 8/1976 | Bagnulo . |
| 3,990,525 | 11/1976 | Penny .................................. 384/94 |
| 4,098,358 | 7/1978 | Klima . |
| 4,194,795 | 3/1980 | Rife . |
| 4,200,343 | 4/1980 | Highsmith . |

OTHER PUBLICATIONS

*Drilling Practices Manual*, "Corrosion Control in Drilling Operations", Chapter 15, pp. 381-399, by Charles C. Patton.
ASM Committee on Failures by Corrosion, "Corrosion Failures", Stress-Corrosion Cracking and Failures of Mechanical Face Seals.
*Design Engineering*, "Getting the Jump on Bearing Corrosion", May 1981, pp. 47-49.
*Petroleum Engineer International*, "Mud Pump Failure Analysis", pp. 162-178, Jul. 1981, by Edwin C. Lewis II.
*Kent's Mechanical Engineers' Handbook*, Twelfth Edition, pp. 3-18 and 3-19.
An Unidentified Document Defining Corrosion, p. A3-11.

Primary Examiner—Lenard A. Footland
Attorney, Agent, or Firm—Harold E. Meier

[57] ABSTRACT

The present invention relates to a drill bit (10) incorporating one or more rotary cutters (14). The rotary cutters (14) are supported for rotation by a bearing assembly including ball bearings (28) running in races (24, 26) in the rotary cutter and drill bit body (20). The bearing assembly further includes an annular bushing (34). A sealing assembly (36) including an O-ring seal (38) is provided to seal lubricant within the bearing assembly and prevent external contaminants from entering the bearing assembly. Corrosion has been found to destroy the seal surfaces (42, 44) against which the O-ring seal acts (38). It has been found that plating the sealing surfaces with a material passive to the electrochemical system or higher in the electromotive series than the material forming the sealing surfaces reduces corrosion. Alternatively, a sacrificial anode (68) is provided about the sealing surfaces to render the surfaces cathodic and resist corrosion. In another embodiment, an impressed electrical potential is provided which also renders the sealing surfaces cathodic, thereby reducing corrosion.

3 Claims, 6 Drawing Figures

BEARING SEAL FOR ROTATING CUTTER DRILL BIT

TECHNICAL FIELD

This invention relates to drilling bits, and in particular to drilling with rotating cutter type drill bits.

BACKGROUND ART

Drill bits employing rotary cutters have been used for drilling for many years. The rotary cutters rotate about pins on the drill bit body. The outside surface of the cutters include cutting structure. This structure commonly takes the form of tungsten carbide inserts. The rotation of the cutter over the cutting face pulverizes the rock or other material for ready removal from the hole by circulating drilling mud.

The cutters are typically secured for rotation to the bit body through a roller bearing assembly. A bushing may also be provided between the bit body and the cutter for support. In the past, the bearing assembly has been sealed from the drilling environment by means of a Belleville seal assembly. This seal assembly is not totally effective.

Recently, drill bits have been developed incorporating O-ring seals to seal the bearing assembly. Pressure compensating devices have also been developed to maintain the pressure differential across the O-ring seal at a relatively low level to reduce contamination of the bearing under the high pressures encountered in drilling.

While O-ring type seal assemblies have improved the operation of the typical rotating cutter drill bit, the seal assembly has an active service life typically within the range of 100 to 200 hours of drilling. The seal assembly will degrade and permit drilling mud and other fluids present about the drill bit to enter the bearing assembly. Once the bearing assembly is contaminated, the service life is very short. The drilling mud and other fluids about the drill bit commonly contain impurities which quickly abrade the surfaces in the bearing assembly.

The drill bit may also pass through a layer containing hydrogen sulfide. The hydrogen sulfide typically is entrained in the drilling mud in bubble form and quickly acts to destroy the integrity of the O-ring seal assembly. It is common to replace the drill bit whenever a hydrogen sulfide pocket is encountered because the integrity of the seals is almost invariably destroyed.

In an effort to provide longer service life for a drill bit, an effective combination of materials has been developed. The pin or extension of the drill bit body forming the race for the bearings supporting the rotary cutter is formed of forged steel with the bearing race carburized. The bushing between the pin and cutter is formed of a copper alloy. A cobalt alloy surface layer is provided on the pin for contacting the cooper alloy bushing. The sealing surfaces of the roller cutter and body against which the O-ring seal acts are formed of a smooth surface having approximately a ten micro inch finish.

The cost of replacing a drill bit is expensive and the operation time consuming. Even worse, should a drill bit fail within the hole, resulting in cutter parts or other debris remaining in the hole, a very expensive and time consuming fishing operation is required. Therefore, a need has been shown to improve the service life of the rotary cutter type drill bit while retaining the advantages of its present design and material construction.

DISCLOSURE OF THE INVENTION

In accordance with one aspect of the present invention, a drill bit for drilling is provided. The drill bit includes a body having a cutter support structure and a cutting structure thereon. A bearing assembly is provided for rotatably supporting the cutter on the cutter support structure of the body. A seal assembly is provided for sealing lubricant within the bearing assembly. The seal assembly includes a flexible seal member for sealed contact with sealing surfaces on the body and cutter. Anticorrosion elements are provided for rendering the sealing surfaces on the body and cutter cathodic with respect to an anodic material proximate thereto outside the bearing assembly. The anticorrosion structure resists deterioration of the sealing surfaces.

In accordance with another aspect of the present invention, the anticorrosion elements comprise a plating of the sealing surfaces of the body and cutter. The plating material is passive to corrosive effects. In a modification, the plating material is higher in the electromotive force series than the material forming the cutter support structure of the body and the cutter to form the cathodic material.

In accordance with another aspect of the present invention, the anticorrosion elements include a material secured to the body proximate the seal assembly. The material is formed of a material higher in the electromotive force series than the material forming the sealing surfaces and acts as a sacrificial anode to protect the sealing surfaces from corrosion.

In accordance with yet another aspect of the present invention, the anticorrosion elements include a generator for generating an electical potential. Structure is provided for securing the negative terminal of the generator structure in electrical contact with the sealing surfaces. A sacrificial anode is positioned proximate the seal assembly. Structure is also provided for securing the positive terminal of the generator to the sacrificial anode to reduce corrosion of the sealing surfaces.

BRIEF DESCRIPTION OF DRAWINGS

A more complete understanding of the invention and its advantages will be apparent from the following Detailed Description when taken in conjunction with the accompanying Drawings, in which.

DETAILED DESCRIPTION

Figure 1:
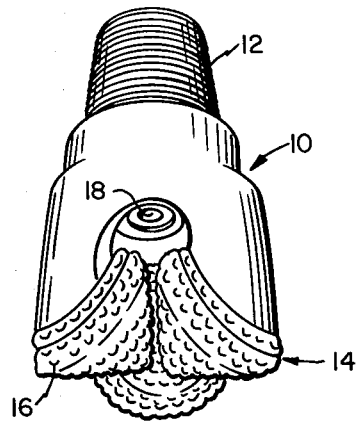
FIG. 1 is a perspective view of a rotary cutter drill bit in which the present invention is incorporated.
Figure 2:
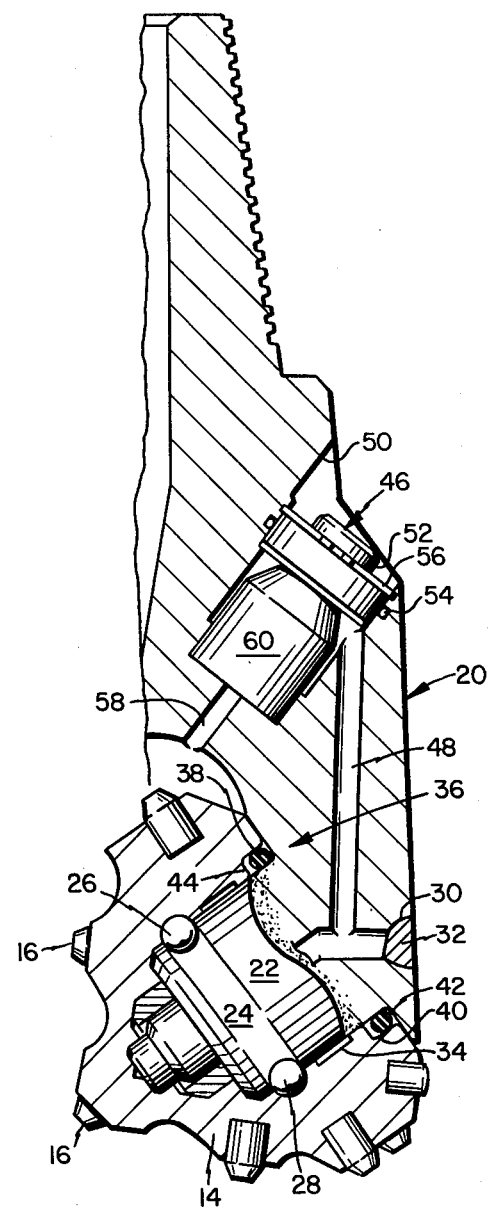
FIG. 2 is a partial cross section of the drill bit illustrating the bearing and sealing assemblies.

Referring now to the drawings, wherein like reference characters designate like or corresponding parts throughout several views, a rotary cutter drill bit 10 typical of those used currently in drilling operations is illustrared in FIGS. 1 and 2. The drill bit 10 is designed for threaded engagement with a drill string through threaded portion 12. The drill string will extend to the surface and be rotated by conventional machinery.

The drill bit 10 has a number of rotary cutters 14 rotatably secured thereon. The rotary cutters have cutting structure 16 on the outside surface thereof. The cutting structure will commonly comprise tungsten carbide inserts. The drill bit 10 illustrated in FIG. 1 includes three rotary cutters positioned at 120° angles about the circumference of the bit. However, any number of rotary cutters can be provided for a particular application.

The drill string transmits a downward force urging the cutting structure of the rotary cutters against the cutting face of the hole being drilled. The cutting structure pulverizes the rock or other material on the cutting face and breaks it into very small pieces. Drilling mud is pumped through the hollow inner core of the drilling string and through aperture 18 in the drill bit to impact upon the cutting face. The drilling mud entrains the particles pulverized by the drill bit. The mud flows upward to the surface about the annular space between the bore hole and the drill string to carry the pulverized material to the surface for disposal.

As best shown in FIG. 2, the drill bit 10 includes a drill bit body 20 having three extending pins 22 (only one shown). The pins include a bearing race 24 extending circumferentially about the pin. A similar bearing race 26 is formed within a cylindrical aperture in the rotary cutter 14. The rotary cutter is positioned so that the bearing races are aligned with the pin extending into the cylindrical aperture thereof. Ball bearings 28 are positioned in rolling contact with the bearing races to rotatably secure the rotary cutter on the pin. The ball bearings are entered through an aperture 30 formed in the drill bit and through a hollow center core in the pin (not shown). Upon filling the bearing races with ball bearings a plug 32 is welded in the aperture 30 to prevent contamination.

An annular bushing 34 is positioned between the rotary cutter and the outer surface of pin 22. The bushing 34 and ball bearings 28 combine with the rotary cutter and pin to form a bearing assembly capable of withstanding the great stresses encountered in drilling.

A sealing assembly 36 is provided which acts to isolate the bearing assembly from the environment surrounding the drill bit. The sealing assembly preferably includes a resilient O-ring type seal 38. A notch 40 is formed about the inner end of the roller cutter 22 at the cylindrical aperture to provide a sealing surface 42 for contact with the O-ring seal. The curvilinear intersection of the pin 22 with the remainder of drill bit 10 forms a sealing surface 44. The drill bit 10 is designed so that the O-ring seal 38 is compressed to a sufficient amount to provide sealed contact with both surfaces 42 and 44. The sealing assembly permits the bearing assembly to be filled with a permanent lubricant to enhance the service life of the drill bit.

A pressure compensating assembly 46 is provided in the drill bit to maintain the pressure differential across the sealing assembly below a predetermined level. A port 48 is formed in the drill bit interconnecting the sealing assembly with a cavity 50. One end of the cavity is sealed from the environment about the drill bit by a cap 52 sealed within the cavity by O-ring 54 and locking ring 56. The opposite end of the cavity 50 communicates to the exterior of the drill bit through port 58. A flexible diaphragm 60 is secured within the cavity. The side of flexible diaphragm 60 in communication with port 48 is filled with lubricant. The port 58 communicates with the opposite side of the diaphragm to permit communication to the outside of the drill bit. The diaphragm 60 maintains the pressure on either side thereof in equilibrium, transmitting the pressure exterior of the drill bit through port 48 to the bearing assembly. The pressure differential across the sealing assembly is thereby maintained below a predetermined level.

Figure 3:
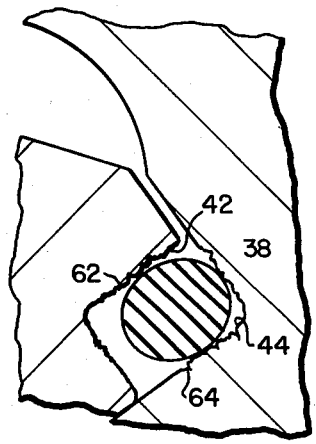
FIG. 3 is an enlarged view of a portion of the cross section of FIG. 2 illustrating the corrosive damage found in prior art devices.

As noted previously, the sealing assembly 36 employed in previous drill bits has degraded after approximately 100 to 200 hours of drilling operation. Upon examining drill bits after use, it has been found that the sealing surfaces 42 and 44 have become pitted and roughened as illustrated in FIG. 3. In particular, the worst pitting has occured in the crevice areas 62 and 64 where the O-ring seal 38 comes into contact with the sealing surfaces on the side of the seal exposed to the enviroment outside the drill bit. It has been determined that this pitting and roughness occurs through corrosion wherein the sealing assembly forms the anode for an electrochemical reaction which causes deterioration and degradation of the sealing surfaces.

Once the sealing surfaces become roughened beyond the nominal ten micro inch finish, the O-ring seal 38 is rapidly deteriorated by contact with the roughened surfaces. In particular, when the rotary cutter 14 slides axially along the pin this forces the O-ring seal to slide along the sealing surfaces. When the sealing surfaces are roughened, the axial motion of the O-ring seal quickly degrades the seal.

While the pressure compensating assembly 46 acts to greatly reduced the pressure differential across the seal assembly, transient pressure changes may induce a pressure differential 400 PSI across the seal assembly for short periods of time. This also acts to urge the seal axially along the sealing surfaces and leads to additional degradation.

Corrosion may begin immediately after manufacture before the drill bit is employed for drilling. The space between the rotary cutter 14 and pin 22 adjacent the sealing assembly is often filled with water during manufacture of the drill bit to prevent overheating of the elastomeric and lubricant during welding of various sections of the drill bit. The drill bits are also frequently exposed to corrosive atmoshperes in shipping and storage, particularly in overseas shipments and offshore drilling.

Also contributing to rapid degradation of the O-ring seal is the drilling environment which often includes fluids that are almost always effecive electrolytes for accelerating the corrosion processes. Such substances include sodium chloride and hydrogen sulfide. Other conditions which contribute to the corrosion activity are elevated temperatures in deep wells and in geothermal wells. A high hydrostatic pressure within the well also increases corrosion activity.

The drilling mud or fluid passing over the drill bit to remove cuttings is traveling at very high velocities and also contributes to rapid degradation of the O-ring seal. The mud is ladened with abrasive cuttings which continuously scour the surfaces of the drill bit to present a chemically fresh surface during drilling.

Even the lubricant in the bearing assembly may contribute to corroson if it is combined with drilling fluids. In particular, a common lubricant additive, molybedenum disulfide, can interact with small quantities of water to produce sulfuric acid.

Figure 4:
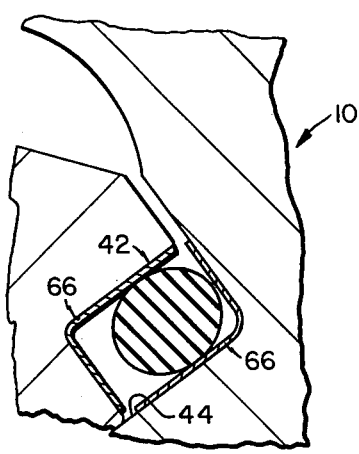
FIG. 4 illustrates the sealing assembly incorporating one embodiment of the present invention with plating of the sealing surfaces.

The present invention reduces the anodic behavior of the sealing assembly to reduce corrosion and thereby increase service life. The first embodiment of the present invention is illustrated in FIG. 4 as a part of the drill bit 10. In this embodiment, the sealing surfaces 42 and 44 are plated with a material 66 resistant to corrosion. As an example, the material 66 comprises electroless nickel plating or electro-deposited high density chromium. While nickel and chromium are lower in the electromotive-force series than iron, these metals are among those that are passive and resistant to corrosive effects. These metals tend to behave electrochemically as more noble metals. As an alternative the material 66 can be higher in the electromotive-force series than iron to form a cathodic surface. As another example, the material comprises an inlay welded into the drill bit body and rotary cutter to form the bearing surfaces. Typical of such an example, a stainless steel inlay is welded by a gas plasma welding technique.

The material 66 acts to reduce the effects of corrosion on the deterioration of the sealing surfaces. The service life of the bearing assembly is therefore increased. Of significance is the fact that the material 66 permits the increased service life without restricting the materials employed for the bearing races and roller bearings. In addition, the material 66 does not restrict the material selection for the annular bushing 34 and treatment of the surfaces in contact therewith.

In a first modification of the first embodiment, the material 66 is plated only on one of the sealing surfaces 42 and 44. For example, the material 66 is plated only on the sealing surface 42. The sealing surface 44 on the rotary cutter would be untreated and would be corroded to a roughened surface during service. The O-ring seal 38 would have a tendency to adhere to the roughened surface on the rotary cutter and remain stationary with respect thereto. The O-ring seal would then rotate about the sealing surface 42 forming an effective seal by turning on the smooth surface.

Figure 5:
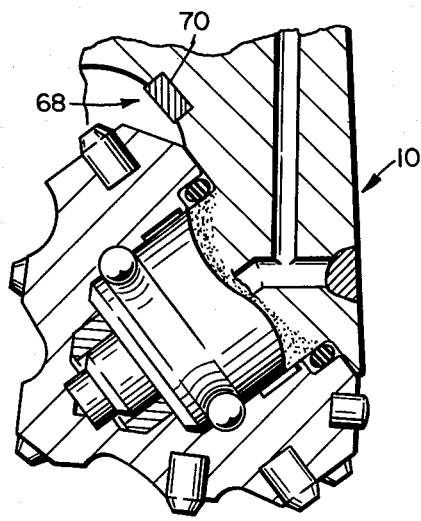
FIG. 5 illustrates a portion of the bearing assembly incorporating a second embodiment of the present invention using a sacrificial anode.

A second embodiment of the present invention is illustrated in FIG. 5 and is also incorporated in drill bit 10. The second embodiment incorporates the use of a sacrificial anode 68 positioned in close proximity to the sealing assembly 36. The sacrificial anode 68 is shown in the form of an annular ring 70 in FIG. 5. The ring is secured, as by welding or other similar technique, to the body of the drill bit circumferentially about the pin 22 and proximate the sealing assembly.

The anode 68 is selected of a material located above the material forming the sealing surfaces 42 and 44 on the electromotive-force series of elements. With the anode 68 having a higher electromotive force, the material of the sealing surfaces would always be cathodic with respect thereto. Current flow between the anode 68 and the sealing surfaces through the electrolytic material surrounding the drill bit tends to corrode and destroy the anode 68 leaving sealing surfaces in a relatively uncorroded condition. The anode, for example, can be made of zinc or a magnesium alloy.

Figure 6:
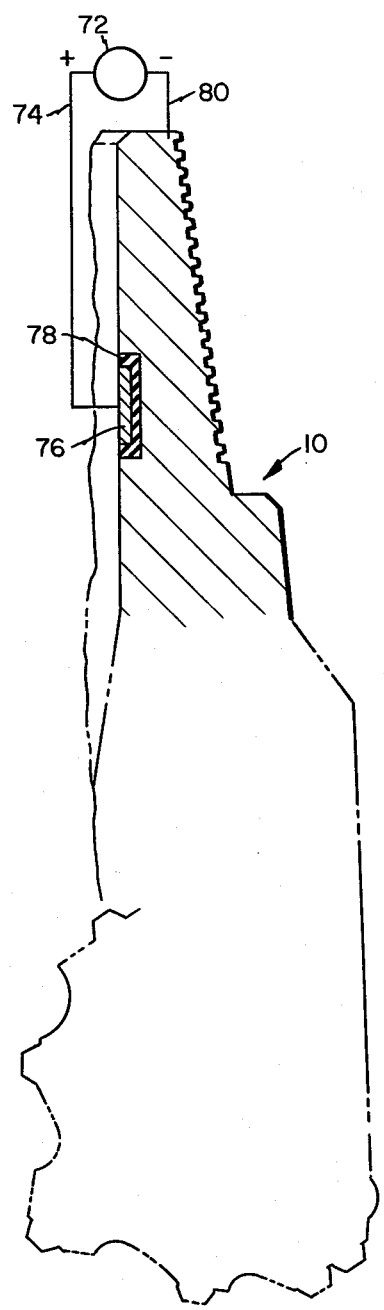
FIG. 6 illustrates a portion of the drill bit incorporating a third embodiment of the present invention having impressed direct current to render the drill bit and sealing assembly cathodic.

A third embodiment of the present invention is illustrated in FIG. 6 in drill bit 10. The third embodiment impresses a direct current on the sealing surfaces 42 and 44 to retain them in a cathodic state. An electrical generator 72 is positioned at the surface of the bore hole to generate a direct current voltage potential. The positive terminal of the generator is connected through suitable elctrical conductor 74 to an electrode 76 secured to the drill bit 10. The electrode 76 is separated from the drill bit 10 electrically by an insulator 78.

Another electrical connector 80 extends from the negative terminal of the generator to electrical contact with the drill bit to render the sealing surfaces 42 and 44 with a negative potential with respect to the electrode 76. The generator provides sufficient power output to render the sealing surfaces cathodic with respect to the electrode 76 and surrounding materials to reduce the corrosive effects on the sealing surfaces.

In conclusion, the present invention provides a technique for increasing the service life of the sealing assembly in rotary cutter drill bits by reducing harmful corrosive effects. The invention permits the proven materials in the drill bit to be retained to insure adequate drilling performance. The present invention therefore provides an economical and readily implemented solution to the early failure of rotary cutters and service in drilling.

While three embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

We claim:

1. A drill bit comprising:
   a body having a cutter support and defining a sealing surface;
   a cutter having cutting structure thereon and defining a sealing surface;
   a bearing assembly for rotatably supporting said cutter on the cutter support of said body;
   a seal assembly including a flexible seal member in seal contact with said sealing surfaces on said body and cutter; and
   an anticorrosion material plated on at least one of the sealing surfaces, said material being resistant to corrosive effects and being higher in the electromotive force series than the material forming the sealing surfaces on said cutter and the cutter support of said body.

2. A rotary drill bit comprising:
   a body having at least one pin extending therefrom and defining a sealing surface, said pin having bearing support structure for receiving roller bearings and carburized for wear resistance;
   at least one rotary cutter having cutter structure on its outer surface and an aperture for receiving the pin of said body and defining a sealing surface, the sealing surface carburized for wear resistance, the aperture having bearing support structure for receiving the roller bearings
   a plurality of ball bearings for placement between the bearing support structures of said pin and rotary cutter for rotatably supporting said rotary cutter on said pin;
   an annular bushing disposed between said pin and said rotary cutter, said bearing support structure, ball bearings and bushing forming a bearing assembly, said annular bushing being formed of a copper alloy; and an anticorrosion material plated on at least on of the sealing surfaces, said material being resistant to corrosive effects and being higher in the electromotive force series than the material forming and sealing surfaces.

3. A drill bit comprising:

a drill bit body having at least one cylindical pin extending therefrom and defining a sealing surface thereon, said pin being formed of forged steel, said pin having a bearing race carburized to enhance wear resistance;

at least one rotary cutter having a cylindrical aperture for receiving said pin and cutting structure on its outer surface, a bearing race being formed on the inner surface of the cylindrical aperture carburized to enchance wear resistance and the inner surface of said cylindrical aperture defining a sealing surface thereon;

a plurality of bearings for rolling engagement with said bearing races of said pin and rotary cutter;

an annular bushing for positioning between said pin and the inner surface of said aperture, said bushing being formed of a material including a copper alloy, said bearing races, bearings and bushing forming a bearing assembly to rotatably support said rotary cutter on said drill bit;

a resilient O-ring seal for positioning between said sealing surfaces on said pin and inner surface of said cylindrical aperture to seal lubricant within said bearing assembly and protect sand bearing assembly from contaminants, said sealing surfaces defining concentric cylindrical surfaces permitting said seal to move axially along said pin and within said cylindrical aperture while retaining sealing engagement with said seal surfaces; and an anticorrosion material plated on at least one of the sealing surfaces, said material being resistant to corrosive effects and being higher in the electromotive force series than the material forming the sealing surfaces of said cutter and the cutter support of said body.

* * * * *

UNITED STATES PATENT AND TRADEMARK OFFICE
CERTIFICATE OF CORRECTION

PATENT NO. : 4,452,539
DATED : June 5, 1984
INVENTOR(S) : Robert F. Evans and Randy C. Davis It is certified that error appears in the above-identified patent and that said Letters Patent is hereby corrected as shown below:

```
Column 1, line 58, change "cooper" to -- copper --.
Column 2, line 8, before "cutting" insert -- cutter having --;
          line 38, change "electical" to -- electrical --.
Column 3, line 7, change "illustrared" to -- illustrated --.
Column 4, line 23, change "occured" to -- occurred --;
          line 53, change "atmoshperes" to -- atmospheres --.
Column 5, line 4, change "corroson" to -- corrosion --.
Column 6, line 6, change "elctrical" to -- electrical --;
          line 61, after "bearings" insert -- ; --.
Column 7, line 18, change "enchance" to -- enhance --.
```

Signed and Sealed this

Eighteenth Day of December 1984

[SEAL]

Attest:

GERALD J. MOSSINGHOFF

Attesting Officer      Commissioner of Patents and Trademarks